T. W. McKENZIE.
STEERING WHEEL.
APPLICATION FILED SEPT. 30, 1915.
1,184,468.
Patented May 23, 1916.
2 SHEETS—SHEET 1.
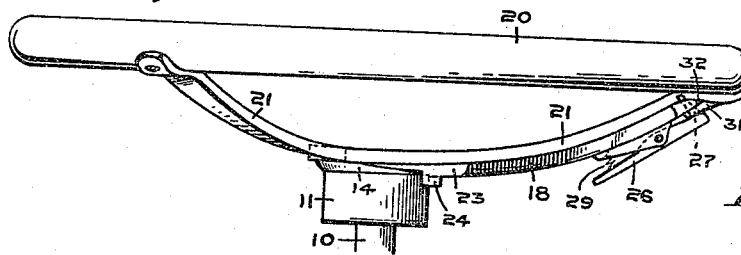
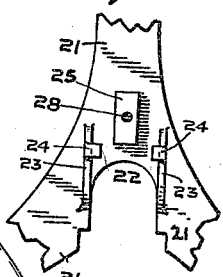
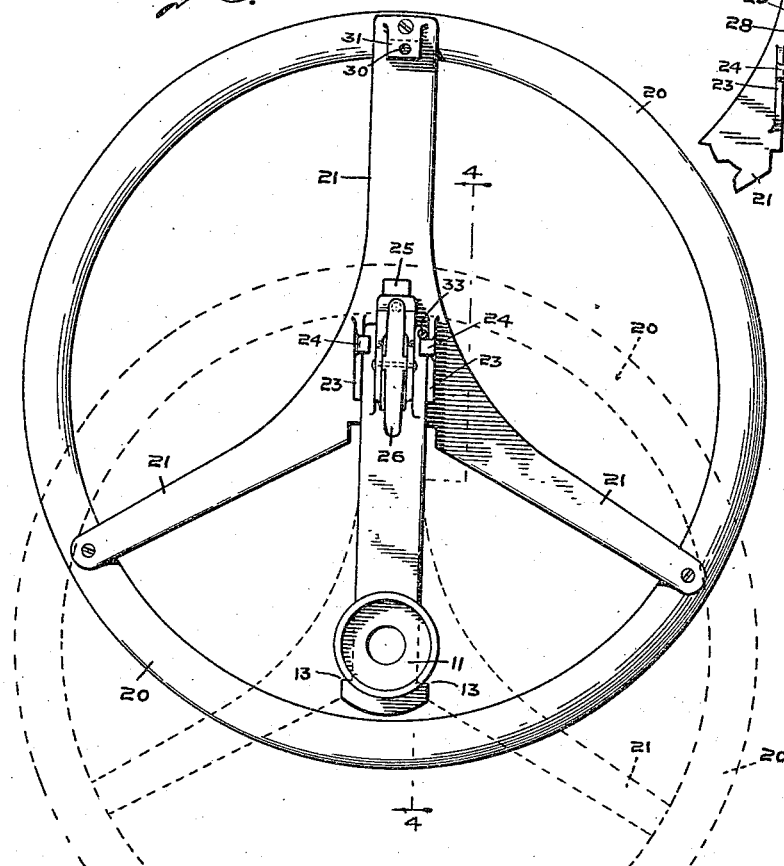
WITNESSES:
INVENTOR
Thomas W. McKenzie,
BY
ATTORNEYS.

T. W. McKENZIE.
STEERING WHEEL.
APPLICATION FILED SEPT. 30, 1915.
1,184,468.
Patented May 23, 1916.
2 SHEETS—SHEET 2.
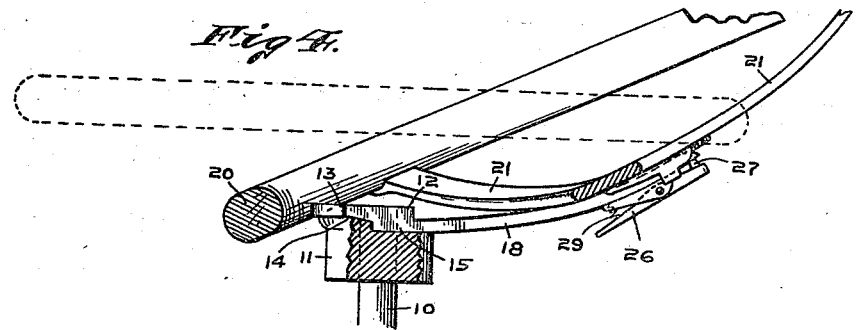
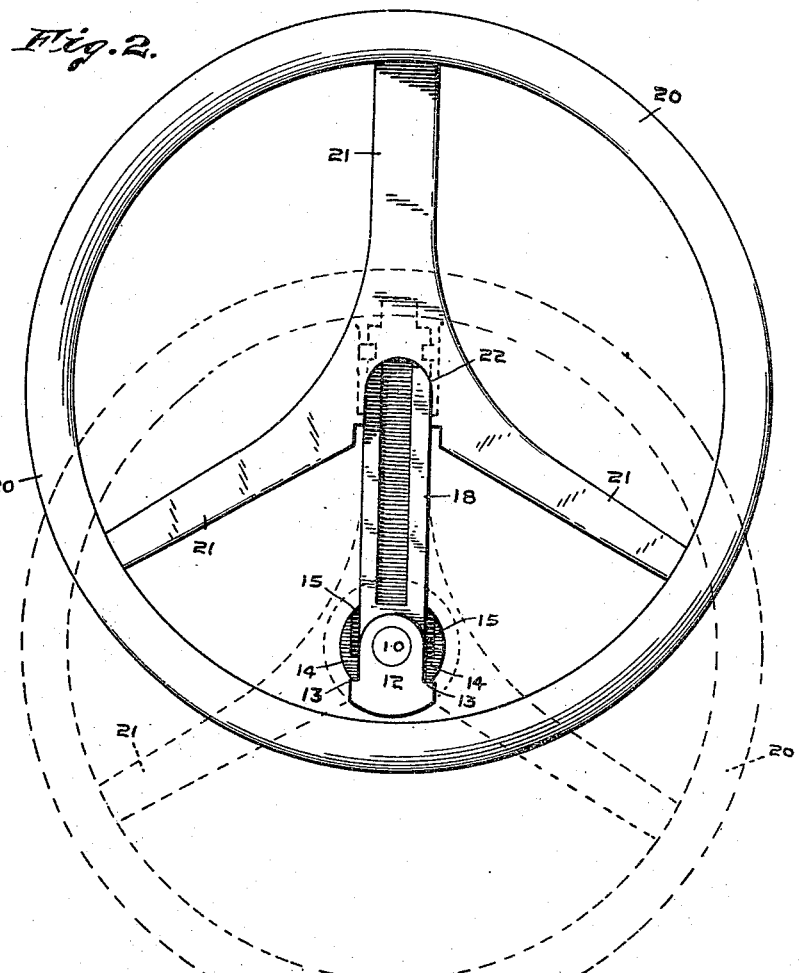

UNITED STATES PATENT OFFICE.

THOMAS W. McKENZIE, OF INDIANAPOLIS, INDIANA.

STEERING-WHEEL.

1,184,468.  Specification of Letters Patent.  Patented May 23, 1916.

Application filed September 30, 1915. Serial No. 53,363.

*To all whom it may concern:*

Be it known that I, THOMAS W. McKENZIE, a citizen of the United States, residing at Indianapolis, in the county of Marion and State of Indiana, have invented certain new and useful Improvements in Steering-Wheels, of which the following is a specification.

This invention relates to steering wheels for motor vehicles, and is an improvement over the steering wheel shown and described in my pending application filed June 5th, 1915, Serial No. 32,380; and the object of the present invention is to provide a steering wheel of the above character which, in addition to its ability to be shifted laterally of the steering shaft in order to provide more room for the operator in entering and leaving the vehicle, is its simplicity of construction, which greatly reduces its cost of manufacture and enables the wheel to be more easily assembled or taken apart; its neatness of appearance, accessibility of parts and compactness.

With the above objects in mind, the invention consists in certain details of construction illustrated in the accompanying drawings, forming a part hereof, in which—

Figure 1 is a side elevation, or edge view, of my improved steering wheel. Fig. 2 is a top or plan view in which the normal position of the wheel is shown by means of dotted lines and its shifted position shown by means of the full lines. Fig. 3 is an underside plan view of the parts occupying the same positions as shown in Fig. 2. Fig. 4 is a fragmentary detail sectional view on the line 4—4 in Fig. 3. Fig. 5 is a fragmentary detail underside view of the central portion of the wheel web, showing the location of the lugs and guide-rib.

Referring to the drawings, 10 represents the conventional steering shaft which is provided at its upper end with a hub 11. This hub is generally round in cross section but the upper portion of the said hub is cut away at several places to form the upper semi-circular member 12 which terminates in shoulders 13. The member 12 is of less diameter than the mean diameter of the hub 11 which leaves the side ledges 14, and the faces of the ledges 14 carry the grooves 15, the objects of these different parts being hereinafter described. The hub 11 is further provided with a curved laterally projecting guide-arm 18 which guides and supports the wheel when the latter is shifted from its normal position. As stated, the arm 18 is curved and this curve coincides with the dished formation of the wheel-web, in order that the arm 18 will closely hug the adjacent wheel spoke when the wheel stands in normal position, making a neat appearing construction.

The steering wheel comprises the conventional rim 20 which is supported by a web composed of three spokes 21 which merge at the axis of the rim. Sufficient stock is retained in the web at the juncture of the spokes to give the required strength after the recess 22 is cut, and the outline of said recess coincides with contour of the semi-circular member 12 of the hub 11 and receives said member 12 when the wheel stands in normal position, to prevent independent rotational movement between said hub and wheel. The web of the wheel is also provided with the integral parallel ribs 23 which form a guide between which the guide-arm 18 rides, and the ribs 23 are provided with the lugs 24 which extend slightly over the surface of the guide-arm 18 to prevent said arm from being displaced perpendicularly. When the wheel is moved home the web will not only be seated firmly upon the faces of the ledges 14, but the ribs 23 on said web will engage the parallel slots or grooves 15 in the faces of said ledges 14 which construction greatly increases the connection between the hub and wheel and prevents the torsional strain, about the only strain to which a steering wheel is subjected, from accidentally separating the parts. As a further guide for the wheel, the web is provided on its under surface with a guide-rib 25 which rides within a longitudinal slot 25ª in the face of the arm 18. When the wheel stands in normal position it is locked by means of a spring latch 26 which is carried by the guide-arm 18, and the latch is provided with a pin 27 which passes into an aperture 30 located in the lug 31 formed on underside of said guide-arm near its outer end and the latch 26 is under a constant tension applied by the spring 29. When the wheel is shifted laterally to the extent of its movement it is locked by means of the latch 26 in which its pin 27 enters an aperture 28 in the rib 25 formed on the underside of the web near the curved end of recess 22. The lug 31 is undercut, or recessed as at 32 (see Fig. 1), and said recess is engaged by and retains the free end of the guide-arm 18. Accidental displacement of the wheel from the guide-arm 18 when the former is shifted transversely is prevented by means of a screw or similar barrier 33 carried in the outer end of said guide-arm 18.

Having thus fully described my said invention, what I desire to secure by Letters Patent, is—

1. In a device of the above described class, the combination, with a steering shaft, a wheel-hub secured to the upper end of said shaft, laterally projecting ledges carried by said hub and provided with horizontally extending parallel grooves, a guide-arm projecting laterally of said hub, a wheel-web arranged to move along and be guided by said arm, said wheel-web being provided with a recess adapted to receive said hub when the wheel occupies normal position, longitudinally extending parallel ribs formed on the underside of the wheel-web and forming a guideway for the guide-arm, means on said ribs and extending inwardly over the channel between said ribs, for holding the wheel-web against vertical displacement of said guide-arm, and ribs carried by said web for normally engaging the horizontal grooves in the head.

2. In a device of the above described class, the combination, with a steering shaft, a wheel-hub secured to the upper end of said shaft, a guide-arm projecting laterally of said hub, said arm being provided with a longitudinal groove, a wheel-web arranged to move along, guided and supported by said arm, means on the web for engaging the longitudinal groove in the arm for keeping the parts alined when the web is shifted, longitudinally extending parallel ribs formed on the underside of the wheel-web and forming a guideway for the guide-arm, and means on said ribs and extending inwardly over the channel between said ribs, for holding the wheel-web against vertical displacement of said guide-arm.

In witness whereof, I have hereunto set my hand and seal at Indianapolis, Indiana, this 8th day of September, A. D. one thousand nine hundred and fifteen.

THOMAS W. McKENZIE. [L. S.]

Witnesses:
F. W. WOERNER,
L. B. WOERNER.

Copies of this patent may be obtained for five cents each, by addressing the "Commissioner of Patents, Washington, D. C."